Aug. 8, 1939.  G. E. McKEEN  2,168,677
LOCKING DEVICE
Filed Nov. 20, 1936

INVENTOR
GEORGE E. McKEEN
BY Paul, Paul & Moore
ATTORNEYS

Patented Aug. 8, 1939

2,168,677

UNITED STATES PATENT OFFICE 2,168,677

LOCKING DEVICE

George E. McKeen, Minneapolis, Minn.

Application November 20, 1936, Serial No. 111,880

1 Claim. (Cl. 292—145)

This invention relates to new and useful improvements in locking devices, and more particularly to such a device adapted for use in connection with the well-known type of no-draft ventilators now used in commercial automotive vehicles.

Numerous automotive vehicles are now provided with windows comprising a small section or panel mounted for pivotal movement about a vertical axis, whereby it may be swung to an open position to permit air circulation within the vehicle body without objectionable drafts. These pivoted sections or panels are usually provided with a suitable operator comprising a crank conveniently mounted within the vehicle, and whereby the pivoted panel may be opened or closed to control ventilation. Unless these panels are securely locked against movement when closed, an unauthorized person may gain access to the interior of the vehicle, even though the doors and windows of the vehicle may be "locked". The inherent construction of the operating means of the so-called no-draft ventilators, is such that frequently these ventilators, or pivoted window panels may be opened sufficiently, when "locked", to permit the insertion of a small instrument, such as a piece of wire, between the partially opened ventilator or panel and its supporting means, and unlatch the door with said wire. It is therefore desirable that means be provided whereby the pivoted panel or ventilator may be securely locked against its seat, so that it cannot be opened from the exterior of the vehicle by an unauthorized person.

An object of the present invention, therefore, is to provide a simple and inexpensive locking device which may readily be attached to the glazed panel or ventilator, and is provided with means for engaging a fixed support to lock the panel against relative movement, when in closed position, and whereby the panel cannot be opened from the exterior of the vehicle.

A further object is to provide such a device formed of sheet metal and comprising a member having a guide therein adapted to receive a suitable slide provided at one end with an offset portion adapted to engage a fixed support, thereby to secure the panel in closed position, and whereby it cannot be opened by an unauthorized person from the exterior of the vehicle.

Other objects of the invention reside in the simple and inexpensive construction of the device which is such that it may readily be attached to the glazed panel without the use of screws or bolts; in the particular manner of fitting it over an edge portion of the glazed panel, whereby when the panel is in closed position, it is impossible to remove the locking device from the panel from the exterior of the vehicle; and, in the construction of such a device which may be manufactured in quantity production at small cost and which, when attached to a pivoted panel, such as the no-draft ventilator of an automobile, provides means whereby the panel may be positively locked against opening by an unauthorized person.

Other objects of the invention will appear from the following description and accompanying drawing and will be pointed out in the annexed claim.

In the accompanying drawing there has been disclosed a structure designed to carry out the various objects of the invention, but it is to be understood that the invention is not confined to the exact features shown as various changes may be made within the scope of the claim which follows.

Figure 1:
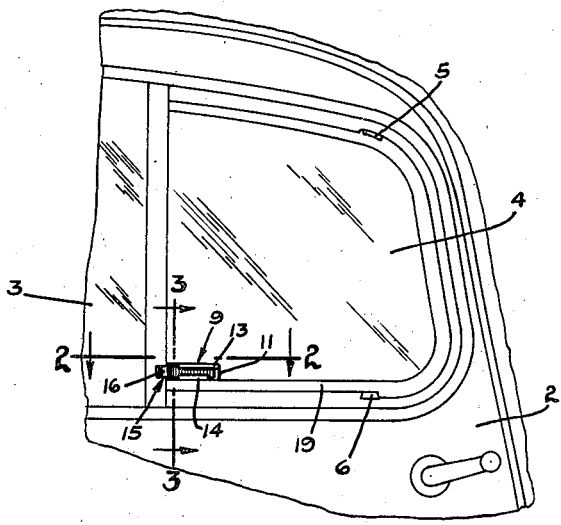
Figure 1 is a view showing a portion of an automobile window of the no-draft ventilator type, with the invention applied thereto.

In the selected embodiment of the invention here shown, there is illustrated in Figure 1, for purposes of disclosure, a portion of an automobile door 2 having a window section 3 of ordinary construction mounted therein, and comprising a so-called no-draft ventilator 4 of the well-known type now commonly used on an automotive vehicle. The panel or ventilator 4 is mounted for pivotal movement about suitable pivots 5 and 6. The window section 3 has a frame 7 at one side provided with a seat 8, against which the adjacent edge of the panel 4 may be seated, as clearly illustrated in Figure 2. The type of panel shown in Figure 1 is, as hereinbefore stated, commonly known as a no-draft ventilator, and permits free ventilation of the interior of the vehicle body without objectionable drafts.

An important feature of the present invention resides in the novel means provided for locking the panel 4 in its closed position, from the interior of the vehicle, and whereby it cannot be opened from the exterior thereof. To thus lock the panel 4 in closed position, a simple locking device, generally indicated by the numeral 9 is fitted onto the lower corner of the panel 4, as best shown in Figure 1.

Figure 2:
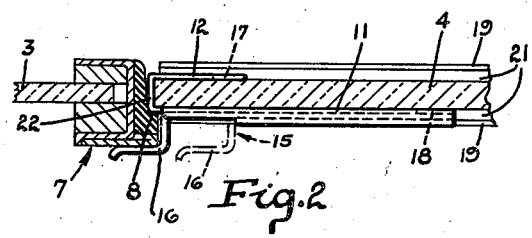
Figure 2 is an enlarged sectional plan view on the line 2—2 of Figure 1, showing the device in locking position.
Figure 4:
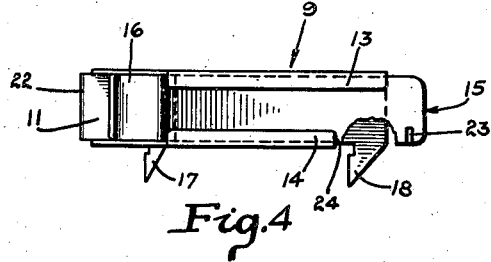
Figure 4 is a side view of the locking device removed from the panel.
Figure 3:
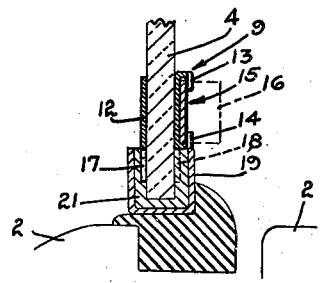
Figure 3 is a detail sectional view on the line 3—3 of Figure 1, showing the sharpened terminals of the device inserted between the glazed panel and its supporting frame.

The locking device comprises a member or wall portion 11 adapted to be seated against the panel 4, as shown in Figures 2 and 3. An offset portion 12 is provided at one end of the wall portion 11, and is spaced therefrom a distance substantially equal to the thickness of the panel 4, as clearly illustrated in Figure 2. The member or wall portion 11 is provided at its upper and lower edges with inturned flanges 13 and 14 spaced from the wall 11 to provide longitudinally extending grooves or guides adapted to receive the opposite edges of a slide, generally indicated by the numeral 15. This slide is provided at one end with an off-set portion 16 adapted to be moved into engagement with the fixed frame 7 of the window section 3, as best shown in Figure 2.

To prevent the locking device from relatively moving on the panel 4, downwardly projecting sharpened terminals 18 and 17 are formed on the member 11 and off-set portion 12, respectively. These terminals are adapted to be inserted between the panel 4 and its supporting frame 19, as best illustrated in Figure 3. The frame 19 is usually of metal, and comprises a suitable flexible channel member 21 in which the edge of the panel 4 is seated, as clearly illustrated in Figure 3.

By securing the locking device to the panel 4, as hereinbefore stated, it will readily be seen that when the panel 4 is in closed position, as shown in Figure 2, the locking device cannot be pried loose or separated from the panel, because of the right angled portion 22 being seated between the adjacent edge of the panel 4 and the frame member 7. It will also be seen that when thus supported, the locking device cannot be unlocked from the exterior of the vehicle.

To operate the locking device to secure the ventilator or panel 4 against opening, the slide 15 is moved from the dotted to the full line position shown in Figure 2, whereby the offset portion 16 of the slide 15 will engage the fixed frame 7 and thereby firmly secure the panel 4 against its seat 8. To unlock the panel, the slide 15 is moved to the right, when viewed as shown in Figures 1 and 2, whereby the offset portion 16 will move out of engagement with the fixed frame 7, thereby permitting the panel 4 to swing outwardly, as will readily be understood by reference to Figures 1 and 2.

This novel locking device has been found very practical in actual use. Because of its simple and inexpensive construction, it may be manufactured in quantity production at small cost, and may readily be applied to conventional no-draft ventilator windows, as herein disclosed, without the use of special tools, or requiring the drilling of holes for screws or other fastening means to secure it in position upon the panel 4. A suitable stop 23 is shown provided at one end of the slide 15 adapted to engage the end 24 of the flange 14, thereby to limit movement of the slide in one direction. Movement thereof in the opposite direction is limited as a result of the off-set portion 16 of the slide engaging the adjacent ends of the inturned flanges 13 and 14, as will be readily understood by reference to Figures 2 and 3.

Conventional no-draft ventilators or windows of the type used on many automotive vehicles, frequently become more or less loose in their supporting means, whereby it may become difficult to keep them tight for winter driving. This difficulty may be quickly remedied by the application of the simple locking device, herein disclosed, as it may readily be attached to the pivoted panel 4, and is very convenient to operate. The device therefore, in addition to providing a safety lock, may also serve to keep the ventilator section or panel 4 tight, in cold weather, and also to prevent it from rattling, when relatively loose in its bearings.

I claim as my invention:

A latch for use with an automobile no-draft window including two glazed panels, one of which is mounted for relative pivotal movement with respect to the other about a substantially vertical axis, said latch comprising a relatively narrow and longitudinally elongated body portion formed of sheet metal and having the longitudinal edge portions deflected to define a guideway, and an end portion deflected to define a hook-shaped portion adapted to engage about an upright edge of the pivoted window panel, said body portion being provided with longitudinally spaced and laterally offset depending barbed prongs adapted to be inserted between the glazed panel and a supporting channel member on opposite sides of said glazed panel to retain the latch in position, a latching bar slidably mounted in said longitudinal guideway closely adjacent said supporting channel member, one end portion of said latching bar being offset and adapted to engage the adjacent edge portion of the upright stile interposed between said window panels, and a projection carried by the opposite end portion of said latching bar for limiting the longitudinal movement thereof.

GEORGE E. McKEEN.